(12) United States Patent
Irvin

(10) Patent No.: US 6,556,819 B2
(45) Date of Patent: Apr. 29, 2003

(54) SAFE ZONES FOR PORTABLE ELECTRONIC DEVICES

(75) Inventor: David R. Irvin, Raleigh, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 10/245,455

(22) Filed: Sep. 17, 2002

(65) Prior Publication Data

US 2003/0017821 A1 Jan. 23, 2003

Related U.S. Application Data

(63) Continuation of application No. 09/398,339, filed on Sep. 17, 1999.

(51) Int. Cl.[7] .................................................. H04M 1/66
(52) U.S. Cl. ........................ 455/410; 455/418; 455/422; 455/456
(58) Field of Search ................................. 455/404, 410, 455/411, 418, 456, 422, 457, 432, 527, 421

(56) References Cited

U.S. PATENT DOCUMENTS

| 5,442,805 A | * | 8/1995 | Sagers et al. ............... 455/456 |
| 5,568,153 A | | 10/1996 | Beliveau |
| 5,760,690 A | | 6/1998 | French |
| 5,778,304 A | | 7/1998 | Grube et al. |
| 5,796,338 A | | 8/1998 | Mardirossian |
| 5,802,468 A | * | 9/1998 | Gallant et al. ............... 455/422 |
| 5,914,675 A | * | 6/1999 | Tognazzini et al. ......... 340/989 |
| 5,926,756 A | * | 7/1999 | Piosenka et al. ............ 455/418 |
| 6,011,973 A | * | 1/2000 | Valentine et al. ........... 455/456 |
| 6,205,326 B1 | * | 3/2001 | Tell et al. .................... 455/406 |
| 6,233,448 B1 | * | 5/2001 | Alperovich ................. 455/414 |

FOREIGN PATENT DOCUMENTS

| WO | WO 98/25433 | 6/1998 |
| WO | WO 98/30056 | 7/1998 |

* cited by examiner

Primary Examiner—Edward F. Urban
Assistant Examiner—Ronald J. Ward
(74) Attorney, Agent, or Firm—Coats & Bennett, P.L.L.C.

(57) ABSTRACT

A security system for a cellular telephone for controlling the status of security features based on location. The invention includes at least one security feature within the cellular telephone that is activated by a triggering event. A memory unit is positioned within the cellular telephone for entering safe zone coordinates. A locator either positioned within, or accessible by, the cellular phone provides for determining the geographic location of the phone. The system compares the present location of the cellular phone with the safe zones maintained in memory. When the triggering event occurs, at least one of the security features is disabled when the cellular phone is within the safe zone coordinates. The security features are maintained enabled when the cellular telephone is outside the safe zone coordinates.

21 Claims, 4 Drawing Sheets

SAFE ZONES FOR PORTABLE ELECTRONIC DEVICES

CROSS REFERENCE TO RELATED APPLICATIONS

This application is a continuation of application Ser. No. 09/398,339, filed on Sep. 17, 1999, which is now abandoned.

BACKGROUND OF THE INVENTION

The present invention is directed to the protection of portable electronic devices and, more particularly, to allocating safe zones defined by the user in which security measures are automatically disabled for a wireless communications device.

A number of security features are available for protecting portable electronic devices against theft and accidental loss. The invention is discussed in terms of portable cellular phones, although it will be understood that it may be applied to a variety of portable devices. These security features include password protection that requires a user to input a correct password prior to using the phone, motion detectors that sound an alarm upon movement of the phone, wireless keys that inhibit the operation of the phone unless the electronic key and the phone are in close proximity, and wireless keys that signal to the user in possession of the wireless key that the phone has been left behind. Each one of these features, when properly enabled, is effective in controlling the use and custody of the phone.

Because these security features restrict the operation of the phone in some form, the features are preferably selectively enabled and disabled by the user. For example, an alarm that guards against movement would likely be disabled when the phone is being used at home, and enabled when the phone is parked for battery charging in a motel room. Because these features must be purposefully enabled and disabled, there is a risk that they will be left inadvertently disabled when needed. Often times it is not intuitive for the user to enable these features when the phone is not in use, especially when the phone is new and unfamiliar to the user. The features are also often left disabled when the user is outside their normal environment, such as travelling through airports and hotels where other concerns are often more pressing. These instances are the most likely for theft or accidental loss of the phone and the most critical times for the features to be enabled.

Additionally, there is considerable nuisance in having to enable and disable the features, as well as having to remember the phone's state at various inopportune times. The status of the safety features often cannot be determined by merely glancing at the outside of the phone. Rather, it is often required that the user pick up the phone, turn on a display screen, input a password, and then review each feature to determine whether it is enabled. Many times the user will just assume that the features are enabled without having any definite verification or knowledge.

There have been previous systems that provide for a network to program geographic areas in which the phones will be automatically disabled such as U.S. Pat. Nos. 5,442,805, and 5,778,304. By way of example, the geocoordinates of an airport or hospital may be stored in the phone and any communication into or out of these areas will be restricted. This is done to ensure that the communications do not interfere with navigation or medical equipment. These previous systems allow for a service provider or system to determine these positions but do not allow for the user to modify and personalize the locations for their own specific use.

Thus, there is a need for a system in which geographic zones can be established by the user in which safety features may be effectively disabled. This reduces or eliminates the need to continuously enable and disable the safety features each time the phone is in use or not in use.

SUMMARY OF THE INVENTION

The present invention is directed to a system for enabling and disabling security features for portable electronic devices based on the location of the device. When the phone is within specified geographic areas, such as the user's home, the security features will be disabled. When the phone is outside of the geographic areas, the security features are enabled; and, upon the occurrence of a triggering event, will be initiated to prevent against theft and accidental loss.

One embodiment of the present invention is directed to a method of providing security for a wireless communications device. The method includes defining at least one geographic safe zone and storing the corresponding geocoordinates in the wireless communications device. At least one security feature is enabled on the device. At the occurrence of a triggering event, the position of the wireless communication device is determined. When the device is outside of the geographic safe zone, the security feature is initiated for protection against theft or accidental loss. When the device is inside of the safe zone, the occurrence of the triggering event will not initiate the security feature.

In another embodiment of the invention, the phone includes a memory to allow for the user to input specific geographic safe zone areas that they frequently occupy, such as their home or office. The phone will be used in these areas under normal conditions, and is understood to be secure. The phone preferably includes a global positioning system that provides for determining the geographic location of the phone and security features such as password protection, motion detector, wireless keys, etc. When the security features are enabled and a triggering event occurs, the invention provides for the current position of the phone is compared with the safe zones. If the phone is in one of the safe zones, the security features will not be initiated. If the phone is outside of any safe zone, the security feature will be initiated.

DETAILED DESCRIPTION OF THE INVENTION

Figure 1:
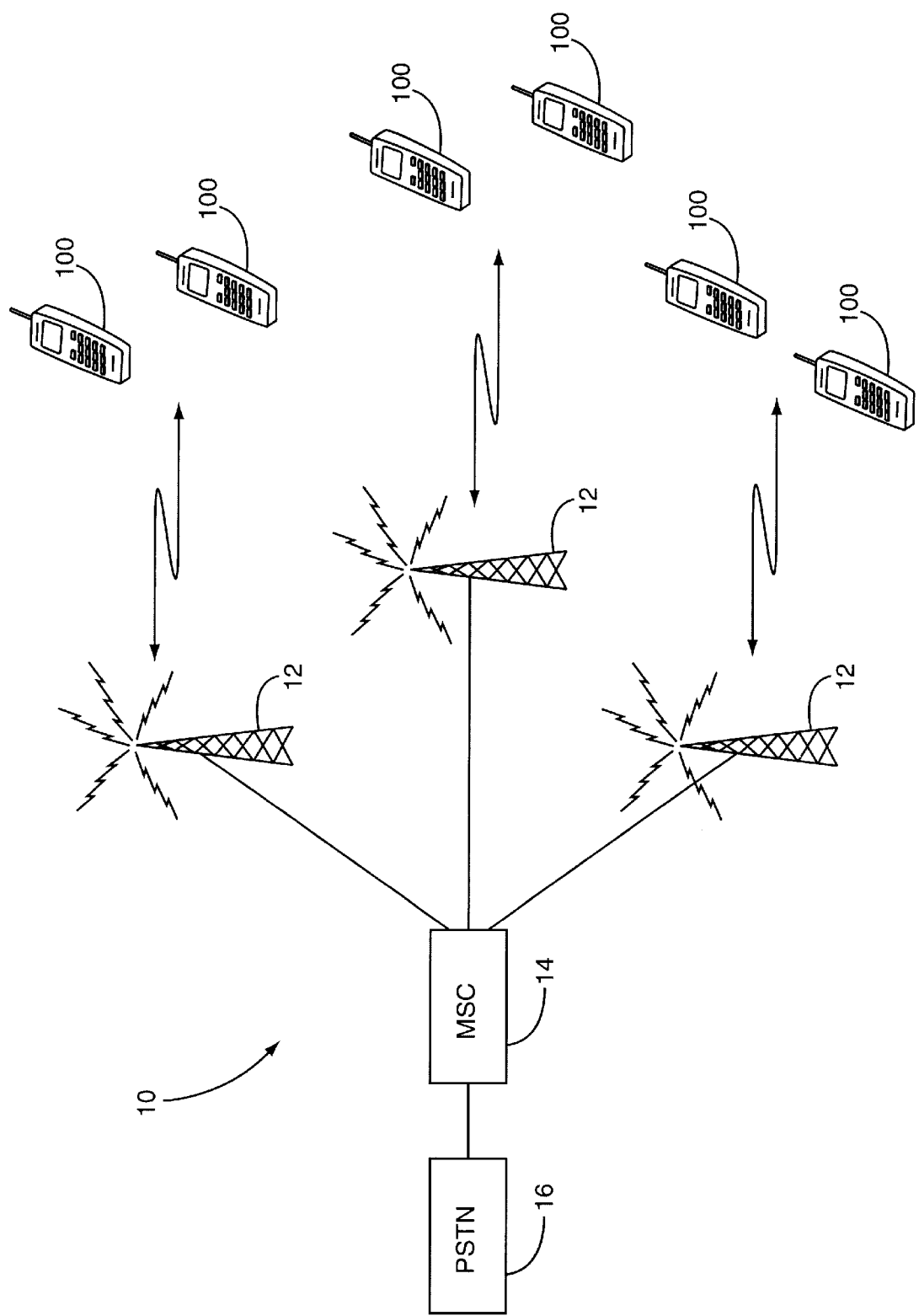
FIG. 1 is a schematic diagram of a communication system.

Referring now to the drawings, a system and method for automatically activating and deactivating security features of a cellular phone based on location will be described. The disclosed embodiment is used in a mobile communications system, and specifically within a cellular phone. However, the invention may be used in other types of portable electronic devices such as personal computers, paging devices, etc.

The mobile communications system, which is indicated generally by the numeral 10 in FIG. 1, typically includes a plurality of base stations 12 which are connected via a mobile switching center (MSC) 14 to a terrestrial communications network such as the Public Switched Telephone Network (PSTN) 16. Each base station 12 is located in and provides service to a geographic region referred to as a cell. In general, there is one base station 12 for each cell within a given system. Within each cell, there may be a plurality of mobile communication terminals 100 that communicate via radio link with the base station 12. The base station 12 allows the user of the mobile communication terminal 100 to communicate with other mobile communication terminals 100, or with users connected to the PSTN 16. The MSC 14 routes calls to and from the mobile communication terminal 100 through the appropriate base station 12. Information concerning the location and activity status of the mobile communication terminal 100 is stored in a database at a locator 18 which is connected to the MSC 14 so that the system can route communications to the base station that is currently servicing the mobile communication terminal 100. In this illustration, the communications system 10 is a digital cellular telephone system such as a system that operates according to ANSI-41/ANSI-136.

Figure 2:
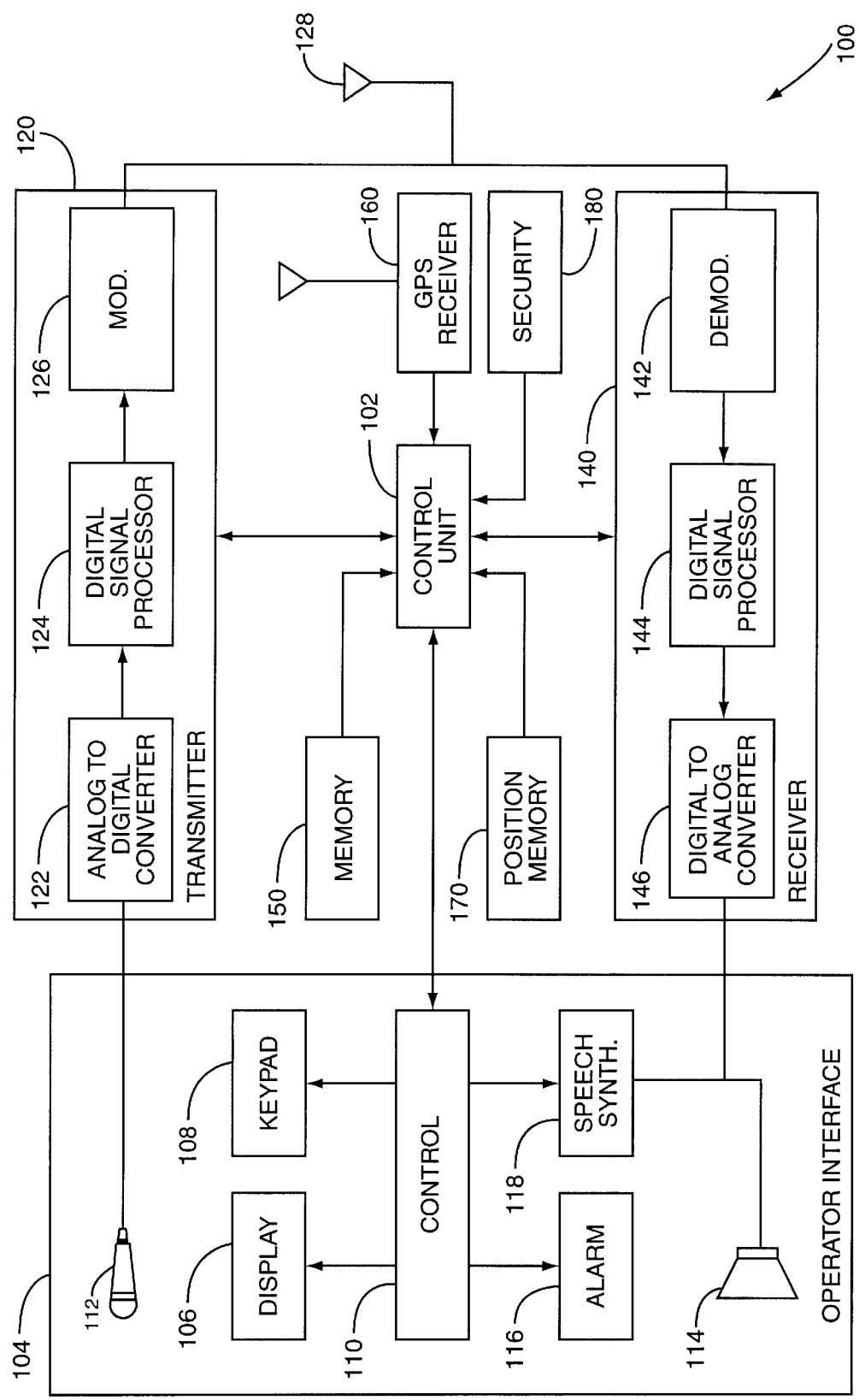
FIG. 2 is a block diagram of a mobile communication terminal that receives the targeted message.

FIG. 2 is a block diagram illustrating one embodiment of the mobile communication terminal 100. The mobile communication terminal 100 shown in FIG. 2 is a fully functional radio transceiver capable of transmitting and receiving digital signals. Those skilled in the art will recognize, however, that the present invention may be implemented in an analog transceiver, as well as in a wide variety of other portable electronic devices. The mobile communication terminal 100 includes a control unit or logic unit 102, an operator interface 104, a transmitter 120, a receiver 140, a memory 150, a positioning receiver 160, a position memory 170, and security unit 180.

The operator interface 104 includes a display 106, keypad 108, control unit 110, microphone 112, speaker 114, alarm 116, and speech synthesizer 118. The display 106 allows the user to see dialed digits, call status information, and security feature status. The keypad 108 allows the user to dial numbers, enter commands, and select options. The control unit 110 interfaces the display 106 and keypad 108 with the control unit 102. The microphone 112 receives audio signals from the user and converts the audio signals to analog signals. Speaker 114 converts analog signals from the receiver 140 to audio signals that can be heard by the user. The alarm 116 produces an audible tone to notify the user in case of receipt of an urgent message or activation of a security feature. The speech synthesizer 118 converts text messages to an audible signal that can be played back through the speaker 114.

The analog signals from the microphone 112 are applied to the transmitter 120. The transmitter 120 includes an analog-to-digital converter 122, a digital signal processor 124, and a modulator 126. The analog to digital converter 122 changes the analog signals from the microphone 112 into a digital signal. The digital signal is passed to the digital signal processor 124. The digital signal processor 124 compresses the digital signal and inserts error detection, error correction and signaling information. The compressed and encoded signal from the digital signal processor 124 is passed to the modulator 126. The modulator 126 converts the signal to a form that is suitable for transmission on a RF carrier.

The receiver 140 includes a demodulator 142, a digital signal processor 144, and a digital to analog converter 146. Received signals are passed to the demodulator 142 which extracts the transmitted bit sequence from the received signal. The demodulator 142 passes the demodulated signal to the digital signal processor 144 which decodes the signal, corrects channel-induced distortion, and performs error detection and correction. The digital signal processor 144 also separates control and signaling data from speech data. The control and signaling data is passed to the control unit 102. Speech data is processed by a speech decoder and passed to the digital-to-analog converter 146. The digital-to-analog converter 146 converts the speech data into an analog signal which is applied to the speaker 114 to generate audible signals which can be heard by the user.

The control unit 102, such as a programmed microprocessor, functions to coordinate the operation of the transmitter 120 and the receiver 140. Memory 150 stores the program instructions and data needed by the control unit 102 to control the communications terminal 100. The functions performed by the control unit 102 include power control, channel selection, timing, as well as a host of other functions. The control unit 102 inserts signaling messages into the transmitted signals and extracts signaling messages from the received signals. The control unit 102 responds to any base station commands contained in the signaling messages, and implements those commands. When the user enters commands via the keypad 108, the commands are transferred to the control unit 102 for action. Because the details of the general construction and operation of the mobile communication terminal 100, are well-known in the art, they will not be further discussed herein except as appropriate to place the invention in context.

The positioning receiver 160 receives signals from a space-based or land-based station that transmits positioning data. For example, the positioning receiver 160 could be a GPS receiver. The received data is passed to the control unit 102 which uses the information to calculate the geographic location of the communication terminal 100. The location is then stored in the position memory 170. The position memory 170 can be an operational register within the control unit 102 or an address space in memory 150. The position memory 170 could also be a separate RAM memory.

Figure 3:
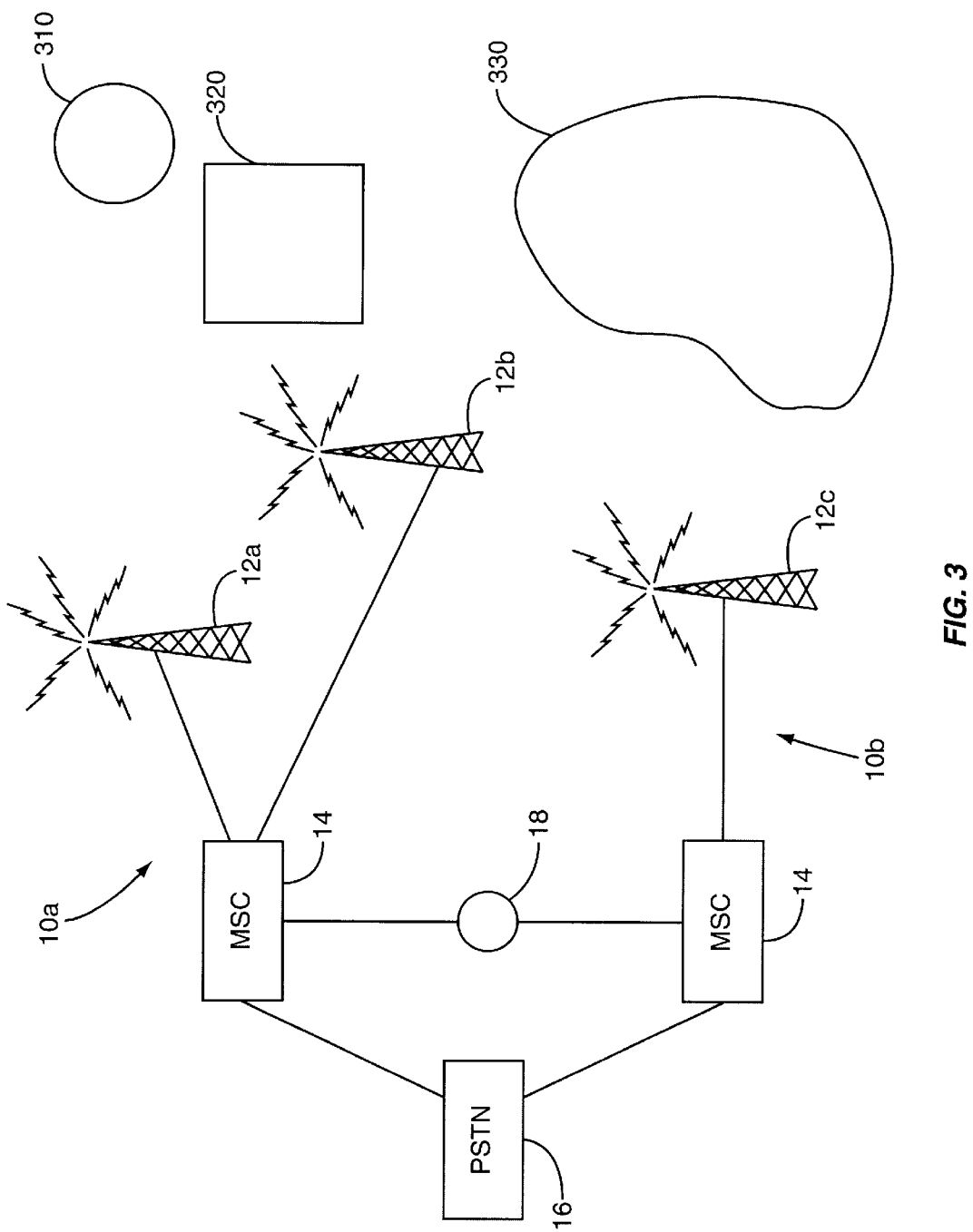
FIG. 3 is a schematic diagram illustrating the positioning of safe zones within communication systems.

Many phones do not contain a GPS receiver and must rely on other means for determining the geographic position. One method provides for the system to monitor the location and relay the information to the phone. As illustrated in FIG. 3, a locator 18 is associated with each system 10 for monitoring the location of the phone 100. As the phone moves through the cells of a system, and between other systems, the position of the phone is tracked and stored at the locator 18. One method-provides for location positioning during a control function such as a phone power-on, transition to a new system, call origination, security feature trigger, phone power-off, etc. Additionally, the system may provide for timer-based or autonomous positioning in which location positioning occurs at periodic intervals while the phone is turned on. The intervals may range between about every few seconds to about once every hour depending upon the parameters of the system. The location information is communicated through the MSC 14 and base stations 12 to the phone's control unit 102. The current position may be saved in the position memory 170 with the previous phone locations, or the memory may only contain the new location.

In another embodiment, the phone location may be maintained only at the locator 18 and not locally within the phone. When the phone location is required, the most recent position maintained within the locator 18 is communicated to the control unit 102 for processing.

Security unit 180 provides features for preventing the theft and inadvertent loss of the phone. Security features available within the phone include motion detectors, password protection, wireless key mode, and others. The motion detectors sense movement of the phone and may communicate with the alarm 116 through the control unit 102 and control 110 to provide an audible alarm upon movement of the phone. Password protection requires the user to input a correct password prior to the control unit 102 activating the phone. When an incorrect password is entered through the keypad 108, the control unit 102 may provide for an additional chance to input the correct password, or may simply turn the phone off preventing a thief or other non-authorized user from transmitting or receiving communications. A wireless key mode requires that a key be within a predetermined proximity to the phone for the control unit 102 to allow the phone to function. It is understood that additional security features may also be included within the present invention. Additionally, a single phone may have numerous security features.

Each enabled security feature will be initiated upon the occurrence of a triggering event. The triggering event may be different for each security feature, such as movement of the phone triggers the motion detector, incorrect password entry triggers the password protection, etc. Preferably, each of the security features may be individually enabled or disabled by the user. By way of example, if the phone is equipped with password protection but the user does not wish to use it, he/she may disable the feature and it will not be initiated during a triggering event. The user may change the status of each security feature through the keypad 108. Preferably, the status of each security feature is shown on the display 106.

Safe zones are geographic areas in which safety features that have been enabled by the user are automatically disabled and will not be initiated upon the occurrence of a triggering event. Because the user commonly frequents these areas, phone usage within the safe zones is understood to be approved usage. As illustrated in FIG. 3, the user may allocate a number of separate safe zones for the phone. In one preferred embodiment, the safe zone may be sized to encompass the dimensions of a house or office building as illustrated by 310. Alternatively, the dimensions of the safe zone may be larger to encompass a square block of a business district 320, or an entire city or state 330. The safe zones may be within a single cell covered by one base station 12, may be positioned in several different cells covered by more than one base station 12, or may be positioned about more than one system. By way of example as illustrated in FIG. 3, safe zone 310 is covered by single base station 12a, safe zone 320 is covered by two base stations 12a and 12b, and safe zone 330 is covered by two base stations 12b, 12c, positioned within two separate systems 10a, 10b. The resolution of the location detection may be such that the exact position of the phone cannot be precisely determined, especially when the phone is located on in the area around the edge or "fringe" of the safe zones. In such a case, the parameters of the system may be established for either considering the phone within or outside of the safe zone when positioned at these "fringe" geographic locations.

The shape and size of the safe zones are defined by the user. In one method, the user inputs the geocoordinates of a center position specifying the latitude and longitude of the center of a circular geographic region, and a radius which specifies the radius of the circular geographic area. Likewise, the safe zone can be defined for other shapes or by specifying the size and using a default center, or by specifying the longitude and latitude of the boundaries of a region, and the like.

There are several different manners of inputting the safe zones into the phone. In a preferred embodiment, the user geographically positions the phone within the middle of the safe zone and determines the geocoordinates from the GPS receiver 160 or the locator 18. Menu options and keypad interaction enables the user to store these into the position memory 170. Additionally, menu options provide for determining the shape and size of the safe zone which are then also stored in the position memory 170. Alternatively, the safe zone geocoordinates can be independently determined by the user and loaded manually into the position memory 170 through the keypad 108. This method provides for the user to input safe zone coordinates when the phone is not physically located at the safe zone position.

Figure 4:
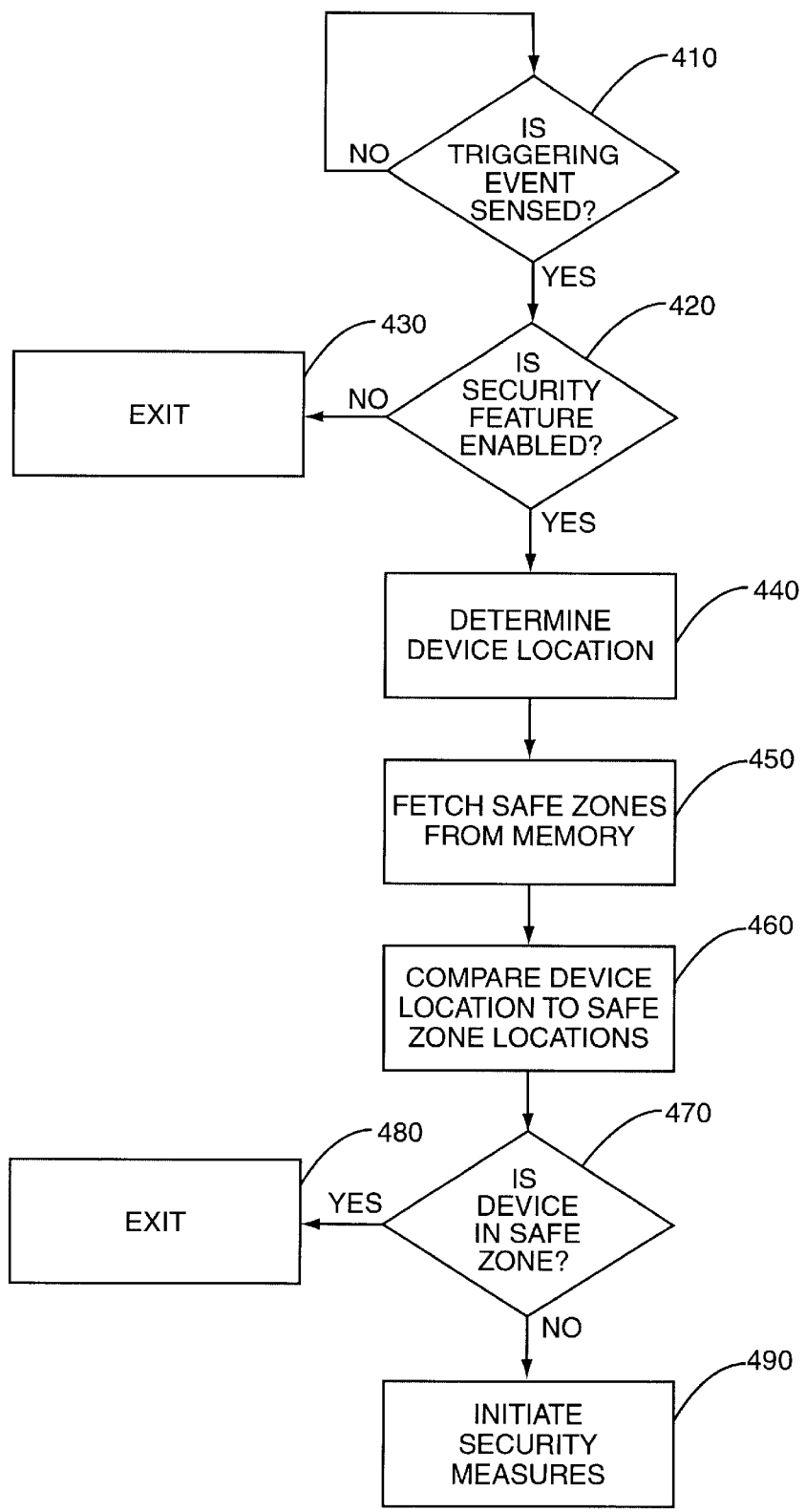
FIG. 4 is a flowchart illustrating the logic of disabling and enabling the security features within the present invention.

FIG. 4 illustrates the logic of the present invention in determining whether to activate the enabled security features. In preparation, safe zones are input into the position memory 170 for those areas that the user frequents. Once enabled, the system waits until an outside triggering event such as motion detection, or powering-on the phone which begins the process (block 410). Once it is determined that the triggering event has occurred, the control unit 102 determines whether security features have been enabled (block 420). If none of the security features have been enabled, the process exits (block 430). When at least one security feature has been enabled, the control unit 102 must then determine the location of the phone (block 440). One method provides for the GPS receiver 160 to determine the phone location at the time of the triggering event. Alternative methods provide for the control unit to use the last known phone location stored within the position memory 170, or the control unit fetches the current positioning information from the locator 18. Once the phone location is determined, the control unit fetches the safe zones from the position memory 170 (block 450) and compares the phone location with the locations of the safe zones stored in the position memory 170 (block 460). If the phone is within a safe zone, the control unit 102 understands the phone to be safe and the process is terminated (block 480). If the phone is not within a safe zone, security measures are initiated such as providing an audio alarm, or activating a secondary security system such as requiring a password (block 490).

More than one security feature may be enabled at a given time. Additionally, different security features may be activated at different areas. By way of example as viewed in FIG. 3, the phone may be equipped with both password protection and a motion detector. Within the user's sales region 330, the user may desire to only disable the password protection but still require that the motion sensor remain enabled because the user is worried of someone stealing the phone while being charged at night in a hotel room. At safe zone 320 which may be the user's office, the motion detector may be disabled because the phone is in the user's pocket all day during work, but the password protection remains enabled because the user does not want someone to inadvertently use the phone. Safe zone 310, representing the user's home, may disable both security features.

Alternatively, the user may provide that all use of the phone outside of a safe zone be prohibited. By way of example, if the user only uses the phone within their home 310. Only usage within the safe zone will be allowed as the security features will remain enabled at all times and will be initiated upon a triggering event.

In the foregoing description, like reference characters designate like or corresponding parts throughout the Figures. Also in the foregoing description, terms such as "forward", "backward", "left", "right", "upwardly", "downwardly", and the like are words of convenience and are not to be construed as limiting terms. Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method of providing security for a portable electronic device comprising:
   a. defining at least one geographic safe zone and storing corresponding geocoordinates in the portable electronic device;
   b. selectively enabling at least one security feature on the portable electronic device;
   c. acquiring the position of the portable electronic device;
   d. sensing the occurrence of a triggering event; and
   e. in response to the sensing of the triggering event, initiating the at least one security feature conditioned on whether the location of the portable electronic device is outside of the at least one geographic safe zone.

2. The method of claim 1, further including storing a plurality of safe zones within the portable electronic device, each of the safe zones being selectively shaped and sized.

3. The method of claim 1, wherein determining the position of the portable electronic device is performed by a GPS receiver contained within the device.

4. The method of claim 1, wherein determining the geographic position of the device is accomplished through a wireless communications system that determines the location of the portable electronic device and forwards the location to the device.

5. The method of claim 1, wherein the position of the portable electronic device is determined at periodic time intervals.

6. The method of claim 1, wherein the position of the portable electronic device is determined at the occurrence of a control function.

7. The method of claim 1, wherein the position of the portable electronic device is determined after the occurrence of the triggering event.

8. The method of claim 1, wherein the position of the portable electronic device is determined prior to the occurrence of the triggering event.

9. The method of claim 8, wherein the position is maintained at a locator and the is portable electronic device fetches the location upon the occurrence of the triggering event.

10. The method of claim 1, wherein the portable electronic device is a wireless communications device.

11. The method of claim 10, wherein the wireless communications device is a cellular phone.

12. A method of providing security features of a wireless communications device, the device having a memory unit and at least one security feature that is activated by a triggering event, the method comprising the steps of:
   a. defining at least one safe zone having a geographic area and storing the at least one safe zone within the memory unit,
   b. selecting which of the at least one security feature will be disabled within each safe zone and storing the selection in the memory unit;
   c. thereafter, sensing the occurrence of the triggering event;
   d. determining whether the wireless communications device is geographically located within any of the safe zones; and
   e. over-riding the security features that are listed within the memory unit for the corresponding safe zone.

13. The method of claim 12, further including disabling at least one security feature within each safe zone.

14. The method of claim 12, further including defining the safe zones by positioning the wireless communication device at a desired safe zone geographic position and entering corresponding geocoordinates into the memory unit.

15. The method of claim 14, further including entering the size and shape of each safe zone into the memory unit.

16. The method of claim 12, wherein defining the at least one safe zone is performed by entering geocoordinates into the memory unit obtained from an independent location device.

17. The method of claim 12 wherein determining the location of the wireless communications device is performed at periodic time intervals and stored within the memory unit.

18. The system of claim 12, further including disabling the corresponding security features when the wireless communications device is positioned within a fringe location of a safe zone.

19. The system of claim 12, further including defining safe zones that are geographically positioned within more than one wireless communications system.

20. A method of preventing theft and accidental loss of a wireless communications device comprising:
   a. defining a safe zone of a geographic area and storing the safe zone within a memory of the device;
   b. enabling a security feature of the device;
   C. sensing the occurrence of a triggering event;
   d. determining the current position of the device through a locator positioned within the device upon sensing the occurrence of the triggering event;
   e. comparing the current position of the device with the safe zone; and
   f. initiating the security feature if the device is positioned outside of the safe zone.

21. A wireless communications device having at least one security feature, said device comprising:
   a. means for defining at least one geographic safe zone and inputting it into a memory unit within the wireless communications device; and
   b. means for determining a geographic location of the cellular telephone;
   c. at least one of said security features being disabled when said wireless communications device is positioned within at least one of said safe zones and being enabled when said wireless communications device is positioned outside said safe zones.

* * * * *